United States Patent [19]

Crommelynck et al.

[11] Patent Number: 4,670,082
[45] Date of Patent: Jun. 2, 1987

[54] MACHINE FOR RETREADING PNEUMATIC TIRES

[75] Inventors: Roger Crommelynck, Deerlijk; Eddy Quartier, Wevelgem, both of Belgium

[73] Assignee: N. V. Bekaert S.A., Belgium

[21] Appl. No.: 798,456

[22] Filed: Nov. 15, 1985

Related U.S. Application Data

[62] Division of Ser. No. 536,771, Sep. 28, 1983, Pat. No. 4,569,709.

[30] Foreign Application Priority Data

Oct. 8, 1982 [BE] Belgium ............................ 1/10608

[51] Int. Cl.⁴ .................... B60C 21/00; B29D 30/54; B29D 30/58
[52] U.S. Cl. ................. 156/405.1; 156/522; 157/13; 425/17; 425/28 R; 425/295
[58] Field of Search ............ 156/95, 96, 128.1, 130, 156/130.5, 267, 270, 123, 124, 110.1, 255, 394.1, 405.1, 522; 157/13; 152/548, 559, 560; 264/36, 37, 163; 425/17, 28, 295

[56] References Cited

U.S. PATENT DOCUMENTS

| | | | |
|---|---|---|---|
| 1,748,590 | 2/1930 | Vincent | 156/95 |
| 3,423,272 | 1/1969 | Sornsen | 156/96 |
| 3,584,673 | 6/1971 | Lehmann | 157/13 |
| 3,607,497 | 9/1971 | Chrobak | 156/95 |

*Primary Examiner*—Donald E. Czaja
*Assistant Examiner*—Thomas Bokan
*Attorney, Agent, or Firm*—Edward J. Brenner

[57] ABSTRACT

This invention relates to a method for applying a tread to a tire, whereby around a toroidal tire a layer of non-vulcanized rubber is applied, which will form the tread area of the tire after vulcanization in the vulcanization press; and whereby the thus prepared tire is vulcanized in vulcanization press. According to the invention, before the vulcanization of the thus prepared tire in a vulcanization press, portions of the layer of non-vulcanized rubber are removed by peeling or by forming peels of non-vulcanized rubber, so that the shape of the peeled tire is adapted to the shape of the vulcanization press. The invention also relates to a machine for carrying out the method according to the invention.

9 Claims, 3 Drawing Figures

MACHINE FOR RETREADING PNEUMATIC TIRES

This application is a division of Ser. No. 536,771, now U.S. Pat. No. 4,569,709 filed on Sept. 28, 1983.

The invention relates to a method and machine for applying the tread surface of a tire.

For repairing tires, such as truck tires, airplane tires, etc., it is a known process to remove the tread area of the tire, and possibly one or several of the reinforcement strips of the belt or breaker located between the tread area and the carcass, which, for example, may be provided with steel wires and steel cords, etc.; subsequently one or several layers of unvulcanized rubber provided with embedded reinforcement elements and a top layer of unvulcanized rubber, which is to form the tread area of the tire after vulcanization in the vulcanization press, are applied. The thus obtained tire, after removal of the old tread area and provided with one or several reinforcement layers of the breaker, will hereafter be called a toroidal tire.

When manufacturing a new diagonal tire or radial tire in a one-step process, see e.g. U.S. Pat. No. 3,756,883, the completely-built, cylindrical tire is expanded into a toroidal configuration during the formation process, whereby the upper layer of unvulcanized or uncured rubber forms the tread surface after vulcanization in the vulcanization press. The toroidally-expanded tire without this upper layer of unvulcanized rubber, will hereafter also be called a toroidal tire.

When manufacturing a radial tire in a two-step process; the first step consists in expanding the partially formed cylindrical tire into a toroidal configuration, after which the second step consists in applying around this toroidal tire one or more layers of unvulcanized rubber containing embedded reinforcing elements to form the breaker or belt and a top layer of unvulcanized rubber to form the tire tread after vulcanization in the vulcanization press. The tire thus expanded into a toroidal shape and comprising one or more reinforcement layers of unvulcanized rubber to form the tire breaker or belt will hereafter also be called a toroidal tire.

The invention particularly relates to a tire-treading method, whereby a layer of non-vulcanized rubber is wrapped around the toroidal tire, after which the thus prepared type is vulcanized in a vulcanization press.

Such a method of making new tires and repairing used tires is generally known. The invention will hereafter be described as being applied in repairing the tread surface of a used tire, but the invention is also applicable in making the tread surface of a new tire.

When applying a new tread surface and one or more breaker or belt reinforcement layers to an old tire, generally substantially the same process steps are required as for making the tread and breaker of a new tire.

A drawback of the hitherto known method for repairing a rubber tire is that it is difficult to apply the right amount of rubber in the right place of the tread area to be formed and to accomplish that after the layer of non-vulcanized rubber has been applied around the toroidal tire, the thus prepared tire is entirely adapted to the shape of the vulcanization press in which it is to be vulcanized. When the thus prepared tire does not correspond exactly with the shape of the vulcanization press, then the eventually formed tire will not have the right shape, or, in other words, the tread surface of the tire will in some places contain too much or too little rubber. It is obvious that this is detrimental to the quality of the formed tire and may sometimes lead to its complete rejection.

Methods for applying a new tread surface to a toroidal tire are already well known. It is their objective to dispose the right amount of non-vulcanized rubber in the right place. Such a method is for example described in U.S. Pat. No. 3,607,497. According to the method of U.S. Pat. No. 3,607,497; a rubber strip with limited width is wrapped by means of an automatically-controlled machine over the full width of the tread area around the toroidal tire in order to dispose the right amount of rubber in the right place. However, this method requires the use of a relatively expensive and complex machine, and, moreover, it is time-consuming due the special wrapping operation with one strip of limited width.

It is an object of the invention to eliminate the disadvantage of the method described above.

Therefore, the invention proposes that with the tire-treading method described above and before vulcanization of the thus prepared tire in a vulcanization press, parts of the layer of non-vulcanized rubber are removed by peeling or by forming peels of non-vulcanized rubber so that the shape of the peeled tire is adapted to that of the vulcanization press. The peeling is preferably done by pressurizing the thus prepared tire and rotating it about its axis against a knife moving over the entire width of the tire, whereby this knife is provided with a driven and tensioned contact roller for the removal of the so formed peels between the knife and the contact rollers. The contact roller is preferably driven by the tire rotating about its axis.

A first advantage of the method according to the invention is that the application of a layer of non-vulcanized rubber around the toroidal tire is an easy operation since the amount of rubber must not be determined accurately. The sole condition is that in all places of the tire circumference an excessive amount of rubber is disposed and it is easy to satisfy this condition by applying a layer of sufficient thickness.

A second advantage of the method according to the invention is that the excess of material or non-vulcanized rubber is removed so that loss of material is avoided, whereby at the same time, the object of having the correct amount of rubber in the right place is reached.

The movement of the knife over the width of the tire is preferably controlled by the shape of a template which is adapted to the shape of the vulcanization press. Preferably, the knife is substantially cylindrical whereby the upperedge of the cylinder forms the actual knife and the contact roller lies substantially with its full width against a part of the upperedge of the cylinder or knife. The knife is preferably connected to a guiding wheel which is moved along the contour of the template to move the knife over the width of the thus prepared tire. The cross-sectional diameter of the cylindrical knife is preferably substantially equal to the diameter of the guiding wheel.

Another advantage of the method according to the invention is that the method can be carried out rapidly with relatively simple means and offers a tire whose shape is accurately adapted to that of the vulcanization press.

It is to be preferred that after carrying off the formed peels of non-vulcanized rubber between the knife and the contact roller, these peels are collected in a container by means of a conveyor belt. Hereby the container is turned about its axis and the formed peels of non-vulcanized rubber are compressed by means of a rotating pressure roller so that a rubber strip is obtained. The advantage is that these rubber strips can be used again in an extrusion press e.g. for the formation of a strip of non-vulcanized rubber for making tire treads.

The invention also relates to a machine for applying a new tread surface to a toroidal tire, the machine being provided with means for gripping and rotating the toroidal tire about its axis and with means for applying a layer of non-vulcanized rubber around the toroidal tire, whereby this layer forms the tread surface of the tire after vulcanization of the thus prepared tire in a vulcanization press.

The machine according to the invention is characterized in, that it is also provided with means for peeling off or forming peels of non-vulcanized rubber from the thus prepared tire so that the shape of the peeled tire is adapted to the shape of the vulcanization press. The peeling means preferably consist of elements for pressurizing the thus prepared tire, a knife that can be moved over the width of the tire, and a driven, tensioned contact roller touching the knife for carrying off the thus formed peels between the knife and the contact roller.

An important advantage of the machine according to the invention is that owing to the position of the driven roller in contact with the knife, the formed peels are removed between the knife and the contact roller so that these peels of non-vulcanized rubber and with a relatively high adhesive strength do not stick to the peeled tire but are removed from it.

An embodiment of the machine may for example consist of a frame container four, two by two vertical or upright members, whereby the first or front pair of members is provided with elements, such as clamping plates, for gripping and rotating a tire about its axis, two horizontal rods, whereby each rod is positioned between a front and a rear member and of a carriage which is reciprocatable along the horizontal rods. According to the invention, this embodiment is also provided with means for fixing the carriage in a place on the horizontal rods which depends on the diameter of the tire to which the tread surface is to be applied.

The advantage is that the machine can be used for a great number of tires with different diameters.

A template is fixed preferably substantially in the center of the carriage opposite the tire clamping plates, whereby elements are provided for moving a guiding wheel along the contour of the template, while the knife is firmly connected to the guiding wheel. The advantage is that the shape of the peeled tire corresponds entirely to the shape of the template, which itself is fully adapted to the shape of the vulcanization press.

The knife is preferably substantially cylindrical whereby the upperedge of the cylinder forms the actual knife and whereby the contact roller lies substantially over its full width against a part of the upperedge of the cylindrical knife. The advantage is that the peels are removed from the peeled tire via the cylinder and therefore cannot stick any longer to the tire. In this preferred embodiment it is desirable that the cross-sectional diameter of the cylindrical knife is substantially equal to the diameter of the guiding wheel to ensure that the shape of the peeled tire corresponds entirely to that of the template.

Preferably, a conveyor belt is situated under the cylindrical knife, whereby a rotatable container is situated at the end of this conveyor belt and whereby this container is provided with means, such as a rotating pressure roller, for shaping and compressing the formed peels into a strip.

The invention will be further clarified in the following description whereby reference is made to the adjoined drawings which contains a schematic view of a preferred embodiment of the arrangement according to the invention. In the drawing.

Figure 1:
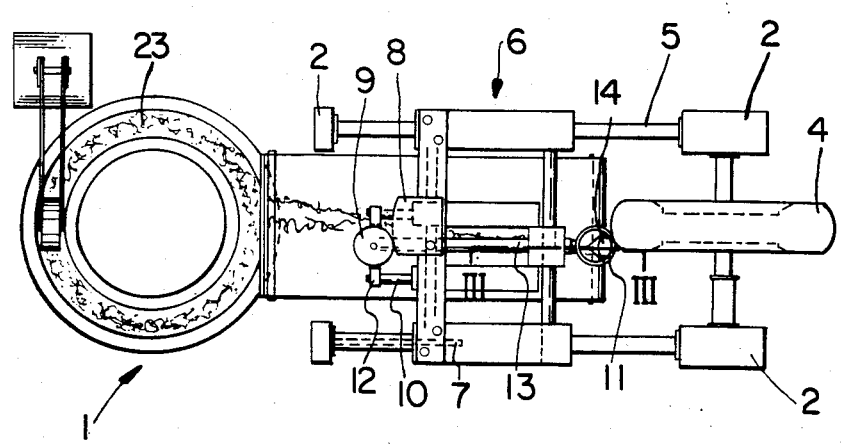
FIG. 1 is a top view of this embodiment.
Figure 2:
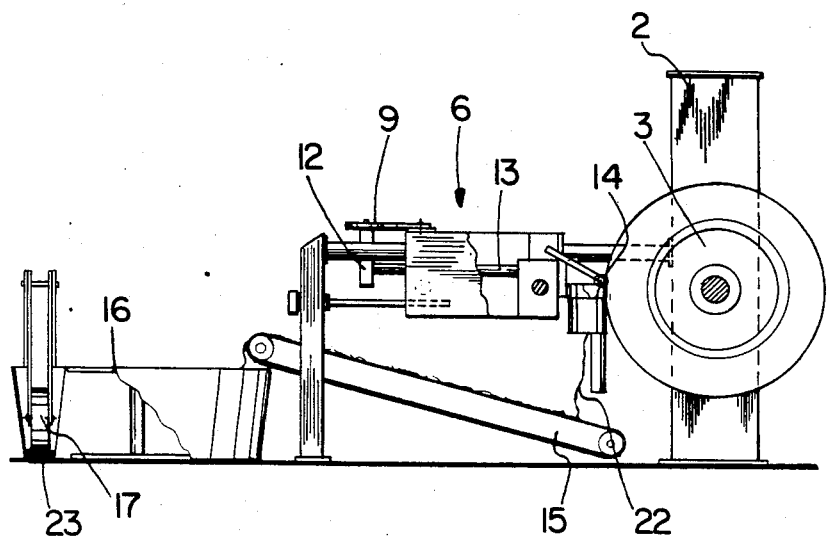
FIG. 2 is a lateral view of this embodiment.

The machine 1 shown in FIGS. 1 and 2 according to the invention comprises four, two by two vertical or upright members 2. Between the front pair of members 2 there are movable clamping plates 3 for clamping the tire 4 in an airtight manner. The machine 1 also comprises two horizontal rods 5, whereby each rod 5 is fixed between a foremost and a rearmost member 2. The machine 1 also comprises a carriage 6 which is reciprocatable along the horizontal rods 5 and which can be adjusted by means of fixing means in a position which is determined by the measuring rod 7 as a function of the diameter of the tire 4 to be treated. In addition, the machine 1 is provided with means for rotating the tire 4 fixed between the clamping plates 3 about its axis and with means for pressurizing the tire 2, to for example 1 to 2 bar.

Approximately in the centre of the carriage 6, between the tire clamping plates 3, the carriage 6 is provided with a template 8. A guiding wheel 9 can be moved along the contour of the template 8 by means of two pressure cylinders 10. A substantially cylindrical knife 11 is fixedly connected to the guiding wheel 9 by means of a connecting plate 12 and the connecting rod 13. The cross-sectional diameter of the cylindrical knife 11 is substantially equal to that of the guiding wheel 9.

A contact roller 14 presses substantially over its full width against a part of the upperedge of the cylindrical knife 11. The actual knife 11 is formed by the upperedge of the cylinder.

Under the cylindrical knife 11 there is a conveyor belt 15. At the end of the conveyor belt 15 there is a truncated coneshaped container 16 which is rotatable about its axis. In the container 16, near the circumference of its bottom there is a rotating pressure roller 17.

Figure 3:
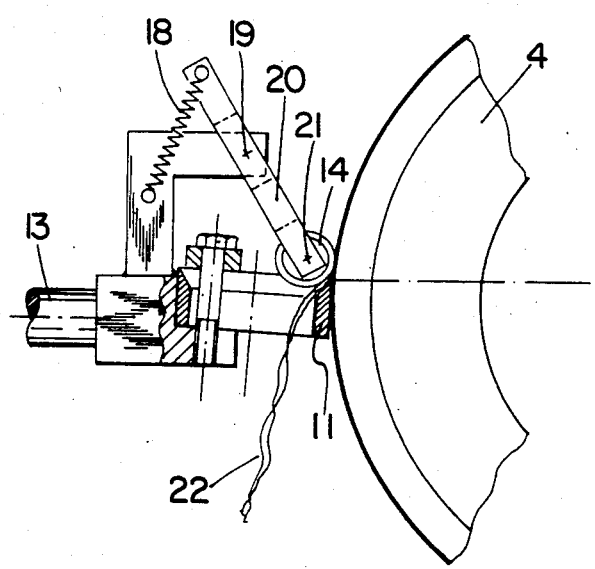
FIG. 3 is a cross-sectional view along the line III—III in FIG. 1.

FIG. 3 shows a cross-sectional and detailed view of an important component of the machine according to the invention, viz. the cylindrical knife 11 connected to the rod 13, whereby the contact roller 14 rests substantially along its full width against the upperedge of the cylindrical knife 11. As is clearly shown by FIG. 3, the pressure roller 14 presses against the upperedge of the cylinder or the knife 11 and against the tire 4. The pressure exerted on the tire 4 and on the knife 11 by the contact roller 14 is obtained by the action of a spring 18 on the arm 20 which hinges about a pin 19. Thereby, the contact roller 14 can rotate about a shaft 21 which is held in the U-shaped end of the arm 20. It is clear that when the tire 4 is driven or turned in a given direction, the contact roller 14 will be driven or turned automatically in the opposite direction. It would also be possible to provide that the contact roller 14 presses against the knife 11 only and not against the tire 4. Then it would be essential to drive the contact roller 14 by means of other means.

The method according to the invention will now be described. A layer or strip of non-vulcanized or uncured rubber is wrapped around the circumference of the toroidal tire 4, so that the ends of the layer or strip overlap substantially. This process of applying a layer of unvulcanized rubber to the toroidal tire can thus be done on other known machines. The thus prepared tire is clamped between the clamping plates 3 of the machine 1 and pressurized, to for example 1 to 2 bar.

By means of the measuring rod 7 and as a function of the diameter of the toroidal tire 2, the carriage 6 is adjusted on the horizontal rods 5 and the guiding wheel 9 is positioned at one end of the template 8, so that the knife 11 and the contact roller 14 are pressed against the tire 4 (see FIG. 1). Subsequently, the tire 4 is driven in a given direction so that the contact roller 14 is driven in the opposite direction, and, at the same time, the guiding wheel 19 is moved slowly along the contour of the template 8. Owing to the rotating movement of the tire 4 against the knife 11, peels 22 of non-vulcanized rubber are removed from the prepared tire and carried off between the rotating contact roller 14 and the knife 11 (see FIG. 3).

The thus formed peels 22 are carried off via the conveyor belt 15 to the container 16, while this container 16 is rotated about its axis. The peels 22 are compressed into a rubber strip 23 with the help of the rotating pressure roller 17.

Although the present invention is described with reference to a tread surface composed of one layer or strip of non-vulcanized rubber; it is also possible to apply the same invention successfully to a number of superimposed strips which together form the tread area of the tire, as for example described in U.S. Pat. No. 3,991,803. It is evident that within the scope of the invention numerous variants are possible.

We claim:

1. A machine for applying a new tread surface to a toroidal tire, wherein the machine is provided with means for clamping and rotating the toroidal tire about its axis and with means for applying a layer of non-vulcanized rubber to a toroidal tire, whereby this layer forms the tread surface of the tire after vulcanization of the thus prepared tire in a vulcanization press, characterized in that the machine (1) is also provided with means for peeling or forming peels (22) of non-vulcanized rubber of the thus prepared tire (4), so that the shape of the peeled tire (4) is adapted to the shape of the vulcanization press, said means for peeling the tire including elements for pressurizing the prepared tire (4), a knife (11) that can be moved over the width of the tire (4), and a driven and tensioned roller (14) touching the knife (11) for carrying off the formed peels (22) between the knife (11) and the contact roller (14).

2. A machine according to claim 1, whereby the machine is composed of, among other things, a frame comprising four, two by two vertical or upright members, whereby the first or front pair of members is provided with elements, such as clamping plates, for seizing and rotating a tire about its axis, two horizontal rods, whereby each rod is fixed between a front and a rear member, and of a carriage which is reciprocatable over the horizontal rods, characterized in, that means (7) are provided to fix the carriage (6) on the horizontal rods (5), depending on the diameter of the tire (4) to which the tread surface is to be applied.

3. A machine according to claim 2, characterized in, that in substantially the centre of the carriage (6) opposite the clamping plates (3) for the tire (4) a template (8) is mounted on the carriage (6), that elements are provided for moving a guiding wheel (9) along the contour of the template (8) and that the knife (11) is fixedly connected to the guiding wheel (9).

4. A machine according to claim 3, characterized in, that the knife (11) is substantially cylindrical, whereby the upperedge of the cylinder forms the actual knife (11), and that the contact roller (14) rests with substantially its full width against a part of the upperedge of the cylindrical knife (11).

5. A machine according to claim 4, characterized in, that the cross-sectional diameter of the cylindrical knife (11) is substantially equal to the diameter of the guiding wheel (9).

6. A machine according to claim 5, characterized in, that a conveyor belt (15) is situated under the cylindrical knife (11).

7. A machine according to claim 6, characterized in, that there is a container (16) at the end of the conveyor belt (15).

8. A machine according to claim 7, characterized in that the container (16) shows a truncated cone-shaped surface and is rotatable about its axis.

9. A machine according to claim 8, characterized in, that the container (16) is provided with a rotating pressure roller (17) which is located near the circumference of the bottom of the container (16) in the container.

* * * * *